United States Patent [19]

Wenzel et al.

[11] Patent Number: 5,166,312

[45] Date of Patent: Nov. 24, 1992

[54] MOLDING POLYAMIDE COMPOSITION WHICH ARE STABLE TO ALCOHOLS AND BOILING WATER FROM ISOPHTHALIC ACID/DECAMETHYLENE DIAMINE/BIS (AMINO CYCLOHEXYL) METHANE

[75] Inventors: Markus Wenzel; Martin Bartmann, both of Recklinghausen; Jürgen Finke, Marl; Hans-Joachim Panoch, Haltern, all of Fed. Rep. of Germany

[73] Assignee: Huels Aktiengesellschaft, Marl, Fed. Rep. of Germany

[21] Appl. No.: 600,368

[22] Filed: Oct. 19, 1990

[30] Foreign Application Priority Data

Oct. 20, 1989 [DE] Fed. Rep. of Germany ....... 3934927

[51] Int. Cl.$^5$ ............................................. C08G 69/26
[52] U.S. Cl. ..................... 528/340; 524/606; 528/336; 528/346; 528/347
[58] Field of Search ................. 528/340, 346, 347; 524/606

[56] References Cited

U.S. PATENT DOCUMENTS

| | | | |
|---|---|---|---|
| 4,207,411 | 6/1980 | Shue | 528/340 |
| 4,268,661 | 5/1981 | Schmid et al. | 528/340 |
| 4,433,137 | 2/1984 | Pfeifer | 528/348 |
| 4,731,421 | 3/1988 | Hoppe et al. | 525/432 |
| 4,847,356 | 7/1989 | Hoppe et al. | 528/346 |

Primary Examiner—Harold D. Anderson
Attorney, Agent, or Firm—Millen, White, Zelano and Branigan

[57] ABSTRACT

The invention relates to molding compositions which are stable with respect to alcohol and boiling water. The known molding compositions which are stable to boiling water and comprise amorphous copolyamides have unsatisfactory stability to alcohols. There is therefore a demand to improve molding compositions comprising polyamides in this respect.

The invention provides molding compositions based on an amorphous copolyamide prepared from:

(A) isophthalic acid; and
(B) 20-80 mol % of n-decamethylene-1,10-diamine, and 20-80 mol % of bis(4-aminocyclohexyl)methane.

18 Claims, No Drawings

MOLDING POLYAMIDE COMPOSITION WHICH ARE STABLE TO ALCOHOLS AND BOILING WATER FROM ISOPHTHALIC ACID/DECAMETHYLENE DIAMINE/BIS (AMINO CYCLOHEXYL) METHANE

BACKGROUND OF THE INVENTION

The invention relates to molding compositions which are stable to alcohols and boiling water and are based on amorphous copolyamides.

Molding compositions which are stable to boiling water and are based on amorphous polyamides are known (see, e.g., European Patents 50,742 and 69,700 and German Patent 3,600,015). However, there is a crucial problem in the suitability for use of these molding compositions—they are not stable to alcohols, such as for example, methanol, ethanol, propanols, butanols or the like. As the case may be, they tend towards turbidity, swelling or adhesion in the presence of alcohols; in some cases, they are completely soluble in alcohol. However, for many applications, such as, for example, for spectacle frames or inspection windows in apparatuses, stability to alcohols is an absolute necessity.

SUMMARY OF THE INVENTION

An object of the invention is to provide molding compositions which alleviate or do not have the above-mentioned disadvantages, but without losing their other advantageous properties.

Upon further study of the specification and appended claims, further objects and advantages of this invention will become apparent to those skilled in the art.

These objects are achieved with the aid of copolyamides obtained by polycondensation of
A. isophthalic acid with
B. 20-80 mol % of n-decamethylene-1,10-diamine
20-80 mol % of bis(4-aminocyclohexyl)methane.
Preferred molding compositions are those based on copolyamides obtained by polycondensation of
A. isophthalic acid with
B. 40-80 mol % of n-decamethylene-1,10-diamine
20-60 mol % of bis(4-aminocyclohexyl)methane.

In a preferred embodiment, copolyamides in which up to 50 mol % of the isophthalic acid has been replaced by terephthalic acid are used.

The ratio of monomer mixture A to monomer mixture B is preferably about 1:1.

The copolyamides on which the molding compositions according to the invention are based have a relative solution viscosity ($\eta_{rel}$) in the range of about 1.4-2.1, preferably in the range of about 1.55-1.95 The glass point ($T_g$) of the copolyamides is in the range of about 120°-180° C., preferably in the range of about 140°-170° C.

The method of preparing such copolyamides is known in principle. The polycondensation of the components is carried out in the melt. If necessary, the polycondensation can be carried out in the presence of a phosphorus-derived acid of the general formula $H_3PO_n$ where n=2 to 4, or in the present of triphenyl phosphite.

Suitable phosphorus-derived acids are hypophosphorous acid, phosphorous acid and phosphoric acid.

If a catalyst is added, it is employed in amounts of about 0.001-1 mol %, preferably about 0.001-0.1 mol %, relative to the sum of all the monomers.

The reaction is carried out in the melt at temperatures in the range of about 200°-350° C., preferably of about 210°-320° C.

The reaction is usually carried out at atmospheric pressure under inert gas. However, it is also possible to use superatmospheric pressure or subatmospheric pressure.

In order to increase the molecular weight, the copolyamides can be subjected to solid-phase postcondensation in an inert-gas atmosphere.

The copolyamides are converted into molding compositions in customary machines by injection molding or extrusion.

The molding compositions may additionally contain fillers, such as talc, or reinforcing agents, such as glass fibers, ARAMID ® fibers or carbon fibers, and other customary additives, such as, for example, pigments or stabilizers.

The molding composition thus can contain about 0-40 wt %, preferably 0-35 wt % fillers, based on overall weight of the molding composition. Similarly, the molding composition can contain about 0-2 wt %, preferably 0-1 wt % of pigments and about 0-1.2 wt %, preferably 0-0.9 wt % stabilizers.

The molding compositions are converted into molding fibers, films, etc. by customary processes, such as injection molding, extrusion or the like.

The molding compositions according to the invention have surprisingly high stability to alcohols, without their good general properties, in particular the stability to boiling water, being adversely affected.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications cited above and of corresponding application Federal Republic of Germany P 39 34 927.6, filed Oct. 20, 1989, are hereby incorporated by reference.

EXAMPLES

The parameters given in the description and in the examples were determined using the methods below.

The relative solution viscosity ($\eta_{rel}$) was determined on 0.5% strength by weight polyamide solutions in m-cresol at 25° C.

The glass point ($T_g$) results from DSC measurements at a heating rate of 20° K/min.

EXAMPLE 1

| Starting Materials: | 8.306 kg of isophthalic acid | (50 mol) |
|---|---|---|
| | 4.308 kg of n-decamethylene-1,10-diamine | (25 mol) |
| | 5.258 kg of bis(4-aminocyclohexyl)methane | (25 mol) |
| | 18.000 kg of water | |
| | 0.350 g of $H_3PO_2$ (as a 50% strength by weight aqueous solution) | |

The starting materials were dissolved in water under nitrogen in a polycondensation reactor at 170° C. and at a pressure of 9 bar. The temperature of the reaction mixture was increased to 230° C. while maintaining the pressure, and the mixture was then stirred at this temperature for 1 hour. The temperature was subsequently increased to 300° C. The liberated water was removed by distillation. After 4 hours at 300° C., the copolyamide was discharged from the reactor.

$\eta_{rel} = 1.72$; $T_g = 163°$ C.

EXAMPLE 2

| Starting materials: | 4.984 kg of isophthalic acid | (30 mol) |
|---|---|---|
| | 3.323 kg of terephthalic acid | (20 mol) |
| | 6.032 kg of n-decamethylene-1,10-diamine | (35 mol) |
| | 3.155 kg of bis(4-aminocyclohexyl)methane | (15 mol) |
| | 17.000 kg of water | |
| | 0.340 g of $H_3PO_2$ (as a 50% strength by weight aqueous solution) | |

The polycondensation was carried out analogously to Example 1.

EXAMPLE 3

| Starting materials: | 8.306 kg of isophthalic acid | (50 mol) |
|---|---|---|
| | 3.963 kg of n-decamethylene-1,10-diamine | (23 mol) |
| | 5.679 kg of bis(4-aminocyclohexyl)methane | (27 mol) |
| | 18.000 kg of water | | the polycondensation was carried out analogously to Example 1.

$\eta_{rel} = 1.61$; $T_g = 167°$ C.

EXAMPLE 4

The copolyamides prepared in accordance with Examples 1 to 3 were compared with two commercially available copolyamides (A) and (B) labelled as being stable to boiling water.

Copolyamide (A) (TROGAMID® T) contains, as monomers, terephthalic acid and trimethylhexamethylenediamine (isomer mixture comprising approximately equal parts by weight of 2,4,4- and 2,2,4-trimethylhexamethylenediamine).

Copolyamide (B) (GRILLAMID® TR 55) is built up from about 30 mol % of isophthalic acid, about 30 mol % of 3,3'-dimethyl-4,4-diaminodicyclohexylmethane and about 40 mol % of lauryl lactam as monomers.

The copolyamides according to the invention and the comparison products were stored in ethanol for 3 weeks at room temperature. While the copolyamides according to the invention exhibited no change in appearance and solution viscosity, the comparison products became tacky after only a few hours. The boiling water test (24 hours in boiling water) likewise resulted in no change for the copolyamides according to the invention; considerable turbidity was observed for copolyamide (A) and slight turbidity for copolyamide (B).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An amorphous copolyamide, wherein said copolyamide is obtained by polycondensation of a monomer mixture consisting of:
    (A) isophthalic acid; and
    (B) 20-80 mol % of n-decamethylene-1,10-diamine, and 20-80 mol % of bis(4-aminocyclohexyl)methane.

2. An amorphous copolyamide according to claim 1, wherein said copolyamide is obtained by polycondensation of a monomer mixture consisting of:
    (A) isophthalic acid; and
    (B) 40-80 mol % of n-decamethylene-1,10-diamine, and 20-60 mol % of bis(4-aminocyclohexyl)methane.

3. An amorphous copolyamide comprising monomer units of isophthalic acid, n-decamethylene-1,10-diamine, and bis(4-aminocyclohexyl)methane, wherein said copolyamide is obtained by polycondensation of a monomer mixture consisting of:
    (A) 100-50 mol % isophthalic acid, and 50-0 mol % terephthalic acid; and
    (B) 20-80 mol % of n-decamethylene-1,10-diamine, and 20-80 mol % of bis(4-aminocyclohexyl)methane.

4. An amorphous copolyamide according to claim 3, wherein said copolyamide is obtained by polycondensation of a monomer mixture consisting of:
    (A) 100-50 mol % isophthalic acid, and 50-0 mol % terephthalic acid; and
    (B) 20-80 mol % of n-decamethylene-1,10-diamine, and 20-60 mol % of bis(4-aminocyclohexyl)methane.

5. A copolyamide according to claim 3, wherein component (B) is 50-80 mol % n-decamethylene-1,10-diamine and 20-50 mol % bis(4-aminocyclohexyl)methane.

6. A molding composition which is stable with respect to alcohols and boiling water, comprising:
    an amorphous copolyamide obtained by polycondensation of a mixture consisting of components (A) and (B), wherein component (A) is 100-50 mol % isophthalic acid, and 50-0 mol % terephthalic acid, and component (B) is 20-80 mol % n-decamethylene-1,10-diamine and 20-80 mol % bis(4-aminocyclohexyl)-methane; and
    an additive acceptable for molding compositions.

7. A molding composition according to claim 6, wherein:
    component (A) is isophthalic acid and
    component (B) is 20-80 mol % of n-decamethylene-1,10-diamine, and
    20-80 mol % of bis(4-aminocyclohexyl)methane.

8. A molding composition according to claim 7, wherein:
    component (A) is isophthalic acid and
    component (B) is 40-80 mol % of n-decamethylene-1,10-diamine, and 20-60 mol % of bis(4-aminocyclohexyl)methane.

9. A molding composition according to claim 6, wherein:
    component (A) is 100-50 mol % isophthalic acid, and 50-0 mol % terephthalic acid; and component (B) is 40-80 mol % of n-decamethylene-1,10-diamine, and 20-60 mol % of bis(4-aminocyclohexyl)methane.

10. A molding composition according to claim 6, wherein said copolyamide has a relative solution viscosity of 1.4-2.1, determined on 0.5% strength by weight polyamide solution in m-cresol at 25° C.

11. A molding composition according to claim 6, wherein said copolyamide has a relative solution viscosity of 1.55-1.95, determined on 0.5% strength by weight polyamide solution in m-cresol at 25° C.

12. A molding composition according to claim 6, wherein said copolyamide has a glass point, $T_g$, of 120°-180° C.

13. A molding composition according to claim 6, wherein said copolyamide has a glass point, $T_g$, of 140°-170° C.

14. A molding composition according to claim 6, wherein said additive is selected from the group consisting of fillers, reinforcing agents, pigments, stabilizers or mixtures thereof.

15. A molding composition according to claim 14, comprising 0-40 wt % fillers, 0-2 wt % and 0-1.2 wt % stabilizers based on overall weight of the molding composition.

16. A molding composition according to claim 7, wherein components (A) and (B) of said copolyamide are in a ratio of 1:1.

17. A molding composition according to claim 6, wherein component (B) is 50-80 mol % n-decamethylene-1,10-diamine and 20-50 mol % bis(4-aminocyclohexyl)-methane.

18. A molding composition according to claim 6, wherein component (B) is 20-60 mol % n-decamethylene-1,10-diamine and 40-80 mol % bis(4-aminocyclohexyl)-methane.

* * * * *